United States Patent
Kobayashi et al.

(10) Patent No.: US 6,960,899 B2
(45) Date of Patent: Nov. 1, 2005

(54) APPARATUS FOR DISCHARGING A COMBINATION BATTERY CONSISTING OF A PLURALITY OF SECONDARY BATTERIES

(75) Inventors: Tetsuya Kobayashi, Anjo (JP); Masaya Itou, Toyota (JP)

(73) Assignee: Denso Corporation, Kariya (JP)

( * ) Notice: Subject to any disclaimer, the term of this patent is extended or adjusted under 35 U.S.C. 154(b) by 58 days.

(21) Appl. No.: 10/772,261

(22) Filed: Feb. 6, 2004

(65) Prior Publication Data

US 2004/0155629 A1 Aug. 12, 2004

(30) Foreign Application Priority Data

Feb. 10, 2003 (JP) ........................................ 2003-032617
Dec. 17, 2003 (JP) ........................................ 2003-419862

(51) Int. Cl.$^7$ ................................................ H02J 7/00
(52) U.S. Cl. ...................... 320/136; 320/130; 320/133; 320/134
(58) Field of Search ................................ 320/130, 133, 320/134, 136; 361/86, 9.5, 98, 100, 101; 324/415

(56) References Cited

U.S. PATENT DOCUMENTS

| | | | | |
|---|---|---|---|---|
| 4,803,417 A | * | 2/1989 | Nowakowski et al. | 320/136 |
| 5,164,653 A | * | 11/1992 | Reem | 320/135 |
| 5,477,124 A | * | 12/1995 | Tamai | 320/135 |
| 5,578,914 A | | 11/1996 | Morita | 320/122 |
| 5,585,994 A | * | 12/1996 | Tamai et al. | 361/98 |
| 5,850,136 A | * | 12/1998 | Kaneko | 320/119 |
| 5,856,738 A | * | 1/1999 | Yoshimatsu | 320/136 |
| 5,883,495 A | * | 3/1999 | Smith et al. | 320/128 |
| 5,898,293 A | * | 4/1999 | Tamai et al. | 320/136 |
| 5,929,603 A | * | 7/1999 | Nakao et al. | 320/136 |
| 6,242,893 B1 | * | 6/2001 | Freedman | 320/135 |
| 6,377,024 B1 | * | 4/2002 | Choy | 320/118 |
| 6,437,539 B2 | * | 8/2002 | Olsson et al. | 320/118 |
| 6,703,796 B2 | * | 3/2004 | Che-Chen et al. | 315/291 |

FOREIGN PATENT DOCUMENTS

| | | |
|---|---|---|
| JP | A 61-206179 | 9/1986 |
| JP | A 7-336905 | 12/1995 |
| JP | A 11-150877 | 6/1999 |
| JP | A 2000-92733 | 3/2000 |

* cited by examiner

Primary Examiner—Michael Sherry
Assistant Examiner—Samuel Berhanu
(74) Attorney, Agent, or Firm—Oliff & Berridge, PLC (57) ABSTRACT

A discharging circuit, connected to both terminals of a lithium battery, includes a first discharge resistor, a second discharge resistor, and a transistor for occasionally discharging the lithium battery to reduce the SOC difference among respective lithium batteries constituting a combination battery. A voltage detecting circuit detects a terminal voltage of the lithium battery via the first discharge resistor. A discharge controller judges a failure occurring in the discharging circuit based on a comparison between a terminal voltage value detected when the transistor is turned on and a terminal voltage value detected when the transistor is turned off.

9 Claims, 7 Drawing Sheets

APPARATUS FOR DISCHARGING A COMBINATION BATTERY CONSISTING OF A PLURALITY OF SECONDARY BATTERIES

BACKGROUND OF THE INVENTION

The present invention relates to a discharging apparatus for a combination battery. The discharging apparatus according to this invention can be, for example, employed in a hybrid-type electric vehicle or other electric vehicle which usually mounts a combination battery consisting of a plurality of, for example, lithium-ion batteries being serially connected.

Recently, from the view point of the protection of the global environment, the lithium-ion batteries are evaluated as prospective batteries which have the capability of producing a driving power for an electric vehicle (EV) or a hybrid-type electric vehicle (HEV).

However, this battery is delicate and weak against overcharge and overdischarge. If this battery is not used within a predetermined voltage range, the constituent materials will be disengaged and accordingly a remarkable reduction in the capacitance or abnormal heat generation will be caused.

Accordingly, in the usage of the lithium-ion batteries, the upper-limit voltage and the lower-limit voltage must be strictly regulated. For example, a constant voltage charge control is performed within the regulated range. A protection circuit for preventing the voltage from deviating outside this voltage range is used.

However, a driving motor equipped in an electric vehicle, such as HEV or EV, requires approximately 300 V. A combination battery installed on an electric vehicle consists of numerous cells being serially connected. For example, the combination battery requires 150 cells in the case of lead batteries (approximately 2V/cell), 250 cells in the case of nickel-metal hydride (1.2V/cell), and approximately 80 cells in case of lithium-ion batteries (3.6V/cell).

According to this kind of combination battery, respective secondary batteries (hereinafter, referred to as "cells" or "unit cells") are different from each other in the residual capacitance (SOC: state of charge). The difference of secondary batteries in the SOC will cause difference in respective cell voltages (i.e., in respective unit cell voltages).

Namely, according to the combination battery, respective unit cells are different in the value of SOC due to individual difference in the capacitance as well as in the discharge characteristics, and accordingly respective cell voltages are different from each other. According to the charge/discharge control based on a terminal voltage of the combination battery (i.e., combination battery voltage), the control is performed based on an average voltage of respective unit cells. A cell voltage having a cell voltage higher than the average voltage has the tendency of overcharge, while a cell having a cell voltage lower than the average voltage has the tendency of overdischarge.

However, the overcharge durability and the overdischarge durability of the lithium-ion batteries are inferior to those of other kinds of secondary batteries. Furthermore, the organic electrolytic solution of the lithium-ion batteries is not water soluble and hence there is no confined reaction and the uniform charging is unfeasible. The difference among respective cell capacitances will so increase that the combination battery cannot be practically used.

To solve this problem, the Japanese Patent Application Laid-open No. 61-206179 (1986) proposes providing a Zener diode being connected in parallel with each cell to discharge an excessive capacitance exceeding the reverse breakdown voltage via the Zener diode. According to this method, the circuit arrangement is simple. However, it is necessary to add the reverse breakdown voltage to the upper-limit voltage of the battery. Each cell requires a large-scale Zener diode serving as a bypass element for the main current flowing across the combination battery. The cost will so increase that this arrangement cannot be practically used.

To solve the above-described problem, other prior art documents, such as the Japanese Patent Application Laid-open No. 7-336905(1995), the Japanese Patent Application Laid-open No. 2000-92733, and the Japanese Patent Application Laid-open No. 11-150877(1999), disclose a discharging circuit consisting of a discharge resistor and a discharge switch which is connected in parallel with each cell. According to this kind of cell discharge system, the discharging circuit of any cell having a higher terminal voltage is selectively discharged (or the charge current is bypassed) to reduce the voltage difference among respective cells.

However, according to this kind of discharge system, there is a problem that the cell is subjected to overcharge or overdischarge in case of ON failure of the discharge switch (i.e., the failure forcing the discharge switch to always turn on) or OFF failure of the discharge switch (i.e., the failure forcing the discharge switch to always turn off).

The above-described problem also arises when electric double layer capacitors are serially connected. Accordingly, the "cell" described in the following description includes an electric double layer capacitor.

SUMMARY OF THE INVENTION

In view of the above-described problems, the present invention has an object to provide a discharging apparatus for a combination battery which is capable of detecting failure occurring in a cell discharging circuit with a simple circuit structure.

In order to accomplish the above and other related objects, the present invention provides a discharging apparatus for a combination battery, including a discharging circuit with at least one voltage drop element and a discharge switch being serially connected for discharging a secondary battery serving as a constituent battery of a combination battery to reduce voltage differences among respective secondary batteries of the combination battery; a voltage detecting circuit for detecting a terminal voltage of the secondary battery via the voltage drop element; and a discharging circuit failure judging section for judging a failure occurring in the discharging circuit based on a difference or a ratio in a comparison between a terminal voltage value detected when the discharge switch is turned on and a terminal voltage value detected when the discharge switch is turned off, which are time sequentially detected.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Characteristic Features of the Invention

The present invention provides a first discharging apparatus for a combination battery including a discharging circuit, a voltage detecting circuit, and a discharging circuit failure judging section. The discharging circuit, including at least one voltage drop element and a discharge switch being serially connected, is provided for discharging a secondary battery serving as a constituent battery of a combination battery to reduce voltage differences among respective secondary batteries of the combination battery. The voltage detecting circuit detects a terminal voltage of the secondary battery via the voltage drop element. And, the discharging circuit failure judging section judges a failure occurring in the discharging circuit based on a difference or a ratio in a comparison between a terminal voltage value detected when the discharge switch is turned on and a terminal voltage value detected when the discharge switch is turned off, which are time sequentially detected.

With this arrangement, the first discharging apparatus for a combination battery can detect a failure occurring in the cell discharging circuit with a simple circuit structure. In general, the above-described combination battery includes a plurality of batteries, each referred to as "cell", which are serially connected to each other. Each single battery can constitute an independent secondary battery. Alternatively, a plurality of batteries being serially connected as a group can also constitute an independent secondary battery. For the purpose of simplifying the explanation, each secondary battery in the following description is a single battery (i.e., cell).

Furthermore, according to the first discharging apparatus for a combination of this invention, the voltage drop element and the discharge controlling switch are serially connected to constitute the cell discharging circuit. The voltage drop element detects the cell voltage. Preferably, the voltage drop element is a resistance element. However, the voltage drop element can be constituted by any other circuit element causing a voltage drop in response to the flow of direct current and is accordingly not limited to the resistance element.

When the turning-off operation of the discharge switch is normal, no discharge current flows in the discharging circuit. It is thus possible to disregard the voltage drop at the voltage drop element during the cell voltage detection performed through the voltage drop element. The cell voltage detection is accurately performed. It is easy to set the input impedance of the voltage detecting circuit to a very large value. In practice, the current flowing across the voltage detecting circuit via the voltage drop element from the cell during the cell voltage detection can be disregarded.

When the turning-on operation of the discharge switch is normal, the discharge current flows in the discharging circuit and accordingly a significant amount of voltage drop occurs in the voltage drop element due to the discharge current. As a result, when the cell voltage is detected through the voltage drop element, the detected voltage value obtainable in this condition is small compared with the case the discharge switch is turned off.

Next, it is now assumed that the discharging circuit is failed in that no normal discharge function is expected. This failure will occur due to OFF failure of the discharge switch or breaking of wire. The OFF failure forces the discharge switch to always turn off, as described above. In this case, if the cell voltage detection is performed under the condition that an ON command is issued for the discharge switch, the detected voltage will be substantially the same as the voltage detectable in the case that the discharge switch is turned off. Accordingly, when the voltage detected under issuance of the discharge switch ON command becomes substantially equal to the voltage detected under issuance of the discharge switch OFF command and further when the detected voltage value is in the same level as the normal cell voltage value, it can be simply and surely concluded that the discharging circuit is in the OFF failure condition.

Next, it is assumed that the discharging circuit is failed in that no normal discharge shut-off function is expected. This failure will occur due to ON failure of the discharge switch or surface discharge caused by carbonization. The ON failure forces the discharge switch to always turn on, as described above. In this case, if the cell voltage detection is performed under the condition that an OFF command is issued for the discharge switch, the detected voltage will be substantially the same as the voltage detectable in the case that the discharge switch is turned on.

Accordingly, when the voltage detected under issuance of the discharge switch OFF command becomes substantially equal to the voltage detected under issuance of the discharge switch ON command and further when the detected voltage value is fairly smaller than the normal cell voltage value, it can be simply and surely concluded that the discharging circuit is in the ON failure condition.

With this arrangement, it becomes possible to prevent the cell from causing overcharge or overdischarge due to delay in detecting the failure occurring in the discharging circuit. Furthermore, it is preferable that the cell voltage detection under issuance of the discharging circuit ON command and the cell voltage detection under issuance of the discharging circuit OFF command are time sequentially executed at a relatively short time interval, to eliminate adverse influence of cell voltage change caused in response to change of the cell charged condition.

Furthermore, as the voltage detecting circuit detects the cell voltage through the above-described voltage drop element, it becomes possible to reduce the discharge current even when the input resistor of the voltage detecting circuit is small, thereby eliminating the cell failure. The ON resistance of the discharge switch can be set to a large value within a range in which necessary discharge is feasible. Furthermore, serially connecting the discharge switch and the discharge resistor is equivalent to increasing the ON resistance of the discharge switch.

According to the first discharging apparatus of the present invention, it is preferable that the discharging circuit failure judging section cancels the failure judgment or abandons test result when an output voltage change of the voltage detecting circuit or a charge/discharge current of the combination battery is larger than a predetermined value. With this arrangement, it becomes possible to reduce the probability of erroneous judgment resulting from the change in the charge/discharge condition of the combination battery.

According to the first discharging apparatus of the present invention, it is preferable that the discharging circuit failure judging section restricts charge/discharge of the combination battery when an operation test is performed. With this arrangement, it becomes possible to reduce the probability of erroneous judgment resulting from the change in the charge/discharge condition of the combination battery.

According to the first discharging apparatus of the present invention, it is preferable that the discharging circuit failure judging section judges that the discharging circuit is in the ON failure condition when the difference between the terminal voltage value detected when the discharge switch is turned on and the terminal voltage value detected when the discharge switch is turned off is less than a predetermined value and these two terminal voltages are less than a predetermined value. With this arrangement, it becomes possible to promptly detect the ON failure occurring in the discharging circuit and accordingly it becomes possible to take an immediate action for preventing the overdischarge of the cell. Regarding a practical counter-overdischarge action, it will be effective to prevent the combination battery from being used for a long time in a discharge condition or always drive a power generator so that the cell can be kept in a sufficiently charged condition. Furthermore, it will be effective to activate the discharging circuit of other cell to eliminate the charge difference among respective cells in the event that the ON failure of the discharging circuit of an arbitrary cell is detected.

According to the first discharging apparatus of the present invention, it is preferable that the discharging circuit failure judging section prohibits the discharge switch from turning on in an event that the ON failure of the discharging circuit is detected.

More specifically, if the discharging circuit of an arbitrary cell has caused the ON failure, periodically turning on this discharging circuit will promote the discharge tendency of the cell. Hence, intentionally prohibiting the discharge in the cell discharging circuit is effective to suppress the overdischarge of the cell.

According to the first discharging apparatus of the present invention, it is preferable that the discharging circuit failure judging section judges that the discharging circuit is in the OFF failure condition when the difference between the terminal voltage value detected when the discharge switch is turned on and the terminal voltage value detected when the discharge switch is turned off is less than a predetermined value and these two terminal voltages are equal to or larger than a predetermined value.

With this arrangement, it becomes possible to promptly detect the OFF failure occurring in the discharging circuit and accordingly it becomes possible to take an immediate action for preventing the overcharge of the cell. Regarding a practical counter-overcharge action, it will be effective to prevent the combination battery from being used for a long time in a charge condition. Furthermore, it will be effective to deactivate the discharging circuit of other cell to eliminate the charge difference among respective cells in the event that the OFF failure of the discharging circuit of an arbitrary cell is detected.

According to the first discharging apparatus of the present invention, it is preferable that the discharge switch serves as one of two voltage drop elements. In other words, the voltage detecting circuit detects the voltage applied between both terminals of the discharge switch. This arrangement is advantageous in that no additional voltage drop element is added in a discharging circuit. The circuit arrangement can be simplified.

It is preferable that, in the above-described cell voltage detection under issuance of the discharge switch ON command, the ON resistance value of the discharge switch is set to a large value (to a certain amount within a range in which the voltage drop detection is feasible). In the case that the discharge switch is a transistor, the voltage drop of the discharge switch is expressed by a multiplication of the discharge current and the ON resistance value of the discharge switch. Increasing the ON resistance value of the discharge switch is possible as long as the transistor constituting the discharge switch is in its allowable temperature range.

However, the discharge switch is required to have the above-described large ON resistance value only when the above-described discharging circuit is under test. Such a large ON resistance value is unnecessary when the cell discharge is carried out in an ordinary discharging circuit. Hence, it is possible to increase the ON resistance value of the discharge switch only in a short period of time during which the discharging circuit is tested, i.e., only when the cell voltage detection is carried out under the condition that the discharge switch is turned on, while the ON resistance value of the discharge switch in the ordinary cell discharge operation is maintained at a lower value to suppress temperature increase.

As described above, the temperature increase in the discharge switch is almost negligible. There is no necessity of increasing the size of a transistor constituting the discharge switch. And, no consideration for heat radiation or release will be required.

For example, increasing the ON resistance value of the discharge switch is easily realized by supplying a lower gate voltage to a MOS transistor or by reducing a base current in the case of a bipolar transistor.

The first discharging apparatus of the present invention is preferably used for the combination battery consisting of lithium-group secondary batteries because the present invention can greatly improve the safety, i.e., the overcharge and overdischarge durability, of the lithium secondary batteries. The lithium-group secondary batteries include not only lithium-ion batteries but also capacitors.

According to the first discharging apparatus of the present invention, it is preferable that the discharging circuit failure judging section executes the failure judgment when an ignition switch is turned off.

The present invention provides a second discharging apparatus for a combination battery, including a discharging circuit, a voltage detecting circuit, a discharge switch control circuit, a pull-up capacitor, and a discharge resistor. The discharging circuit, including at least one voltage drop element and a discharge switch being serially connected, is provided for discharging a secondary battery serving as a constituent battery of a combination battery to reduce voltage differences among respective secondary batteries of the combination battery. The voltage detecting circuit detects a terminal voltage of the secondary battery via the voltage drop element. The discharge switch control circuit generates an on/off control signal supplied to the discharge switch. The pull-up capacitor connects an output terminal of the discharge switch control circuit to a control electrode of the discharge switch. And, a discharge resistor connects the control electrode of the discharge switch to a lower-voltage side main electrode.

The arrangement of the second discharging apparatus is simple. Under the condition that the discharge switch control circuit is provided independent of the combination battery voltage, the on/off control of the discharge switch is feasible.

Practical Embodiments of the Present Invention

Hereinafter, preferred embodiments of the present invention embodying the discharging apparatus for a combination battery will be explained with reference to attached drawings.

First Embodiment

A preferred embodiment of the discharging apparatus for a combination battery including numerous lithium-ion batteries (i.e., cells) being serially connected will be explained hereinafter.

Circuit Arrangement

Figure 1:
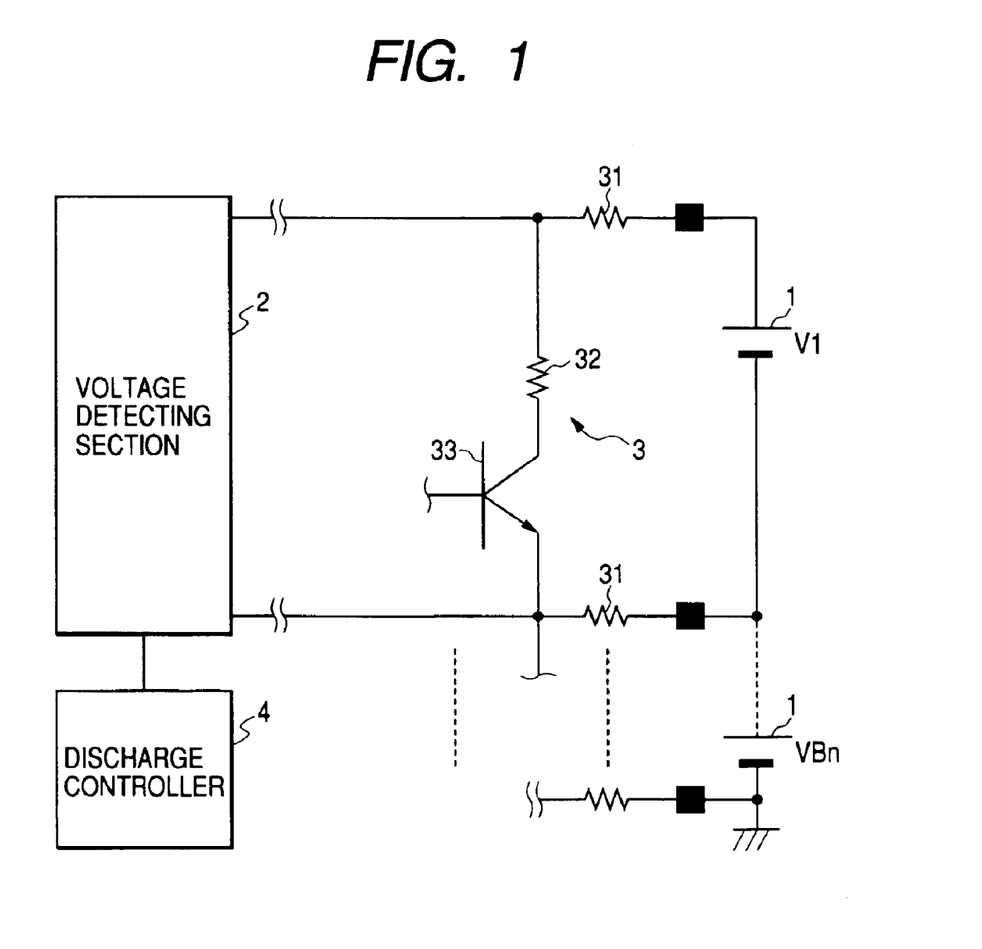
FIG. 1 is a circuit diagram showing a discharging apparatus for a combination battery in accordance with a first embodiment of the present invention.

FIG. 1 is a circuit diagram showing an overall circuit arrangement of this embodiment.

Each cell 1 is a single lithium-ion battery (or a group of serially connected batteries). Numerous cells 1 are serially connected to constitute a combination battery for a hybrid vehicle. In FIG. 1, V1 represents a voltage of a highest potential cell 1, and VBn represents a voltage of n-th cell 1. A voltage detecting circuit 2, provided for each cell 1, individually detects the voltage of the associated cell 1. A discharging circuit 3 is provided for each cell 1. A discharge controller 4 controls the discharge operation of each discharging circuit 3. The discharge controller 4, equipped with a built-in microcomputer, serves as a discharge circuit failure judging section of the present invention. The discharging circuit 3 includes a pair of first discharge resistors (i.e., first voltage drop elements) 31, a single second discharge resistor (i.e., second voltage drop element) 32, a transistor (i.e., discharge switch) 33 which are serially connected with each other. In a practical circuit, a predetermined base current control circuit (not shown in FIG. 1) is provided to control the transistor 33. The base current control circuit for the transistor 33, usually constituted as a bipolar transistor control circuit, has an ordinary circuit arrangement. Two discharging circuits 3 disposed adjacent to each other use the same (common) first discharge resistor 31 interposed between them in discharging the cell 1.

Each first discharge resistor 31 has one end connected to a terminal of the cell 1 and the other end connected via a sequential connection of the second discharge resistor 32 and the transistor 33 to the other end or a neighboring first discharge resistor 31.

The voltage detecting circuit 2 is connected via first discharge resistors 31 to a positive electrode and a negative electrode of the corresponding cell 1 for detecting the cell voltage of this cell. Accordingly, strictly speaking, a cell voltage detected by the voltage detecting circuit 2 is smaller than an actual voltage by the voltage drop caused at respective first discharge resistors 31. However, in the case that the transistor 33 is turned off and the discharging circuit 3 has no failure, no problem will occur because the voltage drop at respective first discharge resistors 31 becomes substantially 0. Furthermore, in an event that the input impedance of the voltage detecting circuit 2 decreases for some reason, the discharge of cell 1 can be suppressed.

According to this embodiment, each first discharge resistor 31 is approximately 50 Ω and the second discharge resistor 32 is 100 Ω. Furthermore, the cell voltage is about 4V. Furthermore, it will be readily understood that using a multiplexer is effective to reduce the total number of voltage detecting circuits 2. Moreover, using a conventionally known flying capacitor battery voltage circuit can be used as the voltage detecting circuit 2 of this embodiment. If the flying capacitor battery voltage detecting circuit is employed, a common flying capacitor will be used so that respective cell voltages can be time sequentially read into the common flying capacitor via the multiplexer.

Failure Diagnosis for Discharging Circuit

Figure 2:
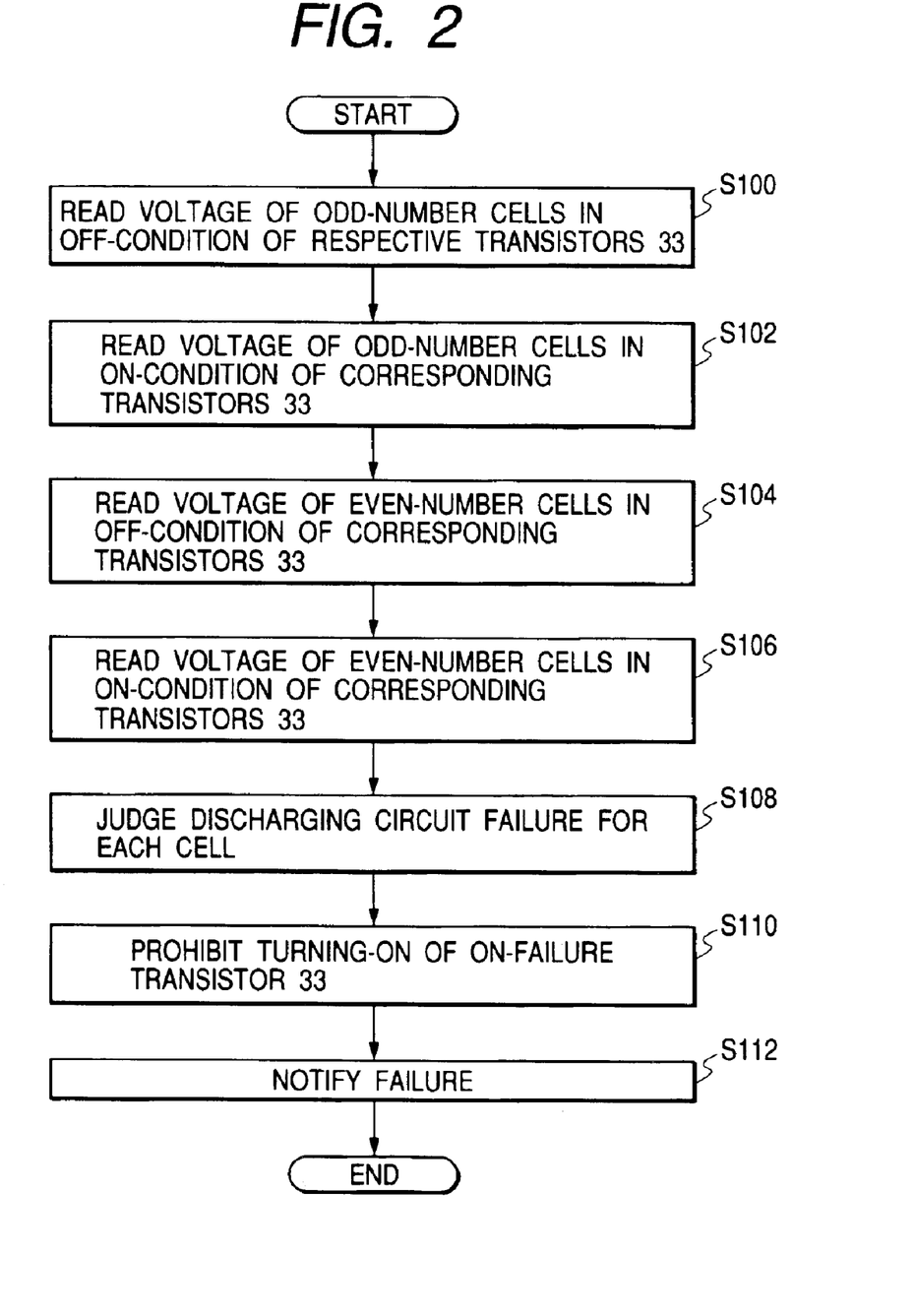
FIG. 2 is a flowchart showing a failure diagnosis operation performed in the discharging apparatus in accordance with the first embodiment of the present invention.

Next, the failure detecting operation of the discharging circuit 3 will be explained with reference to the flowchart show in FIG. 2. The discharge controller 4 executes the routine of this flowchart (i.e., executes the operation test).

Preferably, the routine of this flowchart starts at predetermined intervals, or within a predetermined period during which the charge/discharge operation of the combination battery is not so active. For example, this routine can be executed prior to activation of the motor when the ignition switch of the hybrid vehicle is turned on, or after the ignition switch of the hybrid vehicle is turned off. Furthermore, even after the hybrid vehicle starts traveling or stops, it is possible to periodically execute this routine for failure diagnosis. However, it is preferable to cancel or postpone this failure diagnosis in the case that the charge/discharge current of the combination battery is large. In other words, this failure diagnosis is executed only when the charge/discharge current of the combination battery is small.

In the case that this failure diagnosis could not be performed for a long time, it will be possible to forcibly reduce the charge/discharge current with the power generation control or the load control so that the failure diagnosis can start at an appropriate timing.

Moreover, even when the charge/discharge current is large, the charge of charge/discharge current may be small. In such a case, it is possible to forcibly execute the failure diagnosis because the influence given to the failure diagnosis is small.

First of all, in an ordinary condition that the transistor 33 is not turned on, the discharge controller 4 detects the terminal voltage value of each odd-number cell 1 with the associated voltage detecting circuit 2 and holds the detected value as "previous detection value" (in step S100). Next, the transistor 33 of each odd-number cell 1 is turned on, and then the discharge controller 4 again detects the terminal voltage value of each odd-number cell 1 with the associated voltage detecting circuit 2 and holds the detected value as "present detection value" (in step S102). The turning-on period of the transistor 33 should be set to a value sufficient for the voltage detection, e.g. several milliseconds or several tens of milliseconds.

Next, in the same manner, in the ordinary condition that the transistor 33 is not turned on, the discharge controller 4 detects the terminal voltage value of each even-number cell 1 with the associated voltage detecting circuit 2 and holds the detected value as "previous detection value" (in step S104). Next, the transistor 33 of each even-number cell 1 is turned on, and then the discharge controller 4 again detects the terminal voltage value of each even-number cell 1 with the associated voltage detecting circuit 2 and holds the detected value as "present detection value" (in step S106).

With this processing, the discharge controller 4 obtains the previous detection value and the present detection value of each cell voltage under the condition that the detection of previous detection value and the detection of present detection value are successively done at a short time interval. According to the above-described routine of FIG. 2, the detection of odd-number cell voltage during the ON condition of the transistor 33 (i.e., the processing in step S102) is done independent of the detection of even-number cell voltage during the ON condition of the transistor 33 (i.e., the processing in step S106). This is effective to prevent the voltage drop of the first discharge resistor 31 from being influenced with the failure condition of respective discharging circuits 3 when this first discharge resistor 31 intervenes between two discharging circuits 3 positioned next to each other. However, instead of separating the processing into the block of odd-number cell 1 and the block of even-number cell 1, it is possible to execute time sequential detection for the cells 1. In this case, the total number of the voltage detecting circuits 2 becomes small and respective cell voltages are entered via a multiplexer into a reduced number of voltage detecting circuits 2.

Next, the discharge controller 4 compares the previous detection value and the present detection value for each cell with reference to a normal range of the cell voltage and then makes a judgment as to whether or not any failure is present in the discharging circuit 3 (in step S108).

More specifically, it is now assumed that the working voltage range of an ordinary cell is in a range from 3.0 V to 5.0 V. For example, a threshold level is set to a level smaller than the minimum value (i.e., 3.0 V) of this working voltage range by a predetermined value. According to this embodiment, the threshold level is set to 2.0 V. When the present detection value (i.e., the cell voltage value when the discharge switch is in the ON condition) is smaller than the threshold level and when the previous detection value is larger than the threshold level, the discharge controller 4 judges that the discharging circuit 3 is in the normal condition. When both of the present detection value and the previous detection value are larger than the threshold level, the discharge controller 4 judges that the discharging circuit 3 has the OFF failure. Furthermore, when both of the present detection value and the previous detection value are smaller than the threshold level, the discharge controller 4 judges that the discharging circuit 3 has the ON failure. Namely, when the detected voltage is smaller than the threshold level regardless of ON/OFF condition of the discharging circuit 3, the discharging circuit 3 is in the ON failure condition. On the other hand, when the detected voltage is larger than the threshold level regardless of ON/OFF condition of the discharging circuit 3, the discharging circuit 3 is in the OFF failure condition.

Next, with reference to the above-described judgment result, the discharge controller 4 prohibits the transistor 33 from turning on if this transistor 33 is in the ON failure condition (in step S110). Then, the discharge controller 4 notifies a battery controller (not shown) of detected failure situation (in step S112) and then terminates this routine.

Through this processing, it becomes possible to promptly detect the OFF failure or ON failure occurring in the discharging circuit and accordingly it becomes possible to take an immediate action for preventing the overcharge or overdischarge of the cell.

In the above-described embodiment, in the case the cell 1 is used in the working voltage range (ranging from the minimum working voltage value to the maximum working voltage value), it is preferable to set the detected voltage to become equal to the above-described minimum working voltage or smaller than it by a predetermined value when the discharging circuit 3 is in the normal condition even if the cell 1 has the maximum working voltage value in response to turning-on operation of the discharging circuit 3. This makes it possible to clearly discriminate the voltage reduction caused in the cell 1 from the voltage reduction caused in response to turning-on operation of the discharging circuit 3.

Modified Embodiment

According to the above-described embodiment, the discharge controller 4 judges that the discharging circuit is in the ON failure condition when the detected voltage is smaller than the threshold level regardless of ON/OFF condition of the discharging circuit 3 and also judges that the discharging circuit is in the OFF failure condition when the detected voltage is larger than the threshold level regardless of ON/OFF condition of the discharging circuit 3. However, other various judgments will be used for this invention.

For example, it is preferable to exclude abnormal cells by sorting the normal cells having cell voltages within the predetermined working voltage range (e.g., 3.0 V to 5.0 V) when the discharging circuit 3 is turned off. Then, an average voltage value of the normal cells is calculated. Next, the above-described threshold level is set to be lower than the calculated average value by a predetermined value. This makes it possible to set a proper threshold level, without being adversely influenced by the change of charged condition in each cell. The judgment accuracy can be improved.

Furthermore, it is possible to memorize the cell voltage value in the OFF condition of the discharging circuit 3 as a previous value and then calculate an inherent cell voltage value to be obtained in, the ON condition of the discharging circuit 3 with reference to the relationship between the previous value (i.e., cell voltage value in the OFF condition) and an already-known resistance value of the circuit. The obtained inherent cell voltage is referred to as a theoretical present value. Then, an actual cell voltage value (i.e., a present value) is measured by turning on the discharging circuit 3. When the measured present value is larger than the theoretical present value by a predetermined value, it is possible to conclude that the discharging circuit 3 is in the OFF failure condition.

Second Embodiment

Another preferred embodiment of the present invention will be explained hereinafter with reference to the circuit diagram shown in FIG. 3.

This modified embodiment is different from the first embodiment shown in FIG. 1 in that only one first discharge resistor 31 is provided for each discharging circuit 3. Thus, this embodiment does not commonly use the first discharge resistor 31 for two neighboring discharging circuits 3. Therefore, under the condition that the transistors 33 of respective discharging circuits 3 are all turned on, each voltage detecting circuit 2 detects the cell voltage of an associated cell 1. The detected value is referred to as a cell voltage value in the ON condition of the transistor 33. Similarly, it is possible to simultaneously sample respective cell voltages under the condition that all of the transistors 33 are in the OFF condition. In this case, to detect a voltage value similar to that detected in the first embodiment, the second discharge resistor 32 should have the same resistance value (i.e., approximately 50 Ω) as that of the first discharge resistor 31.

Third Embodiment

Figure 4:
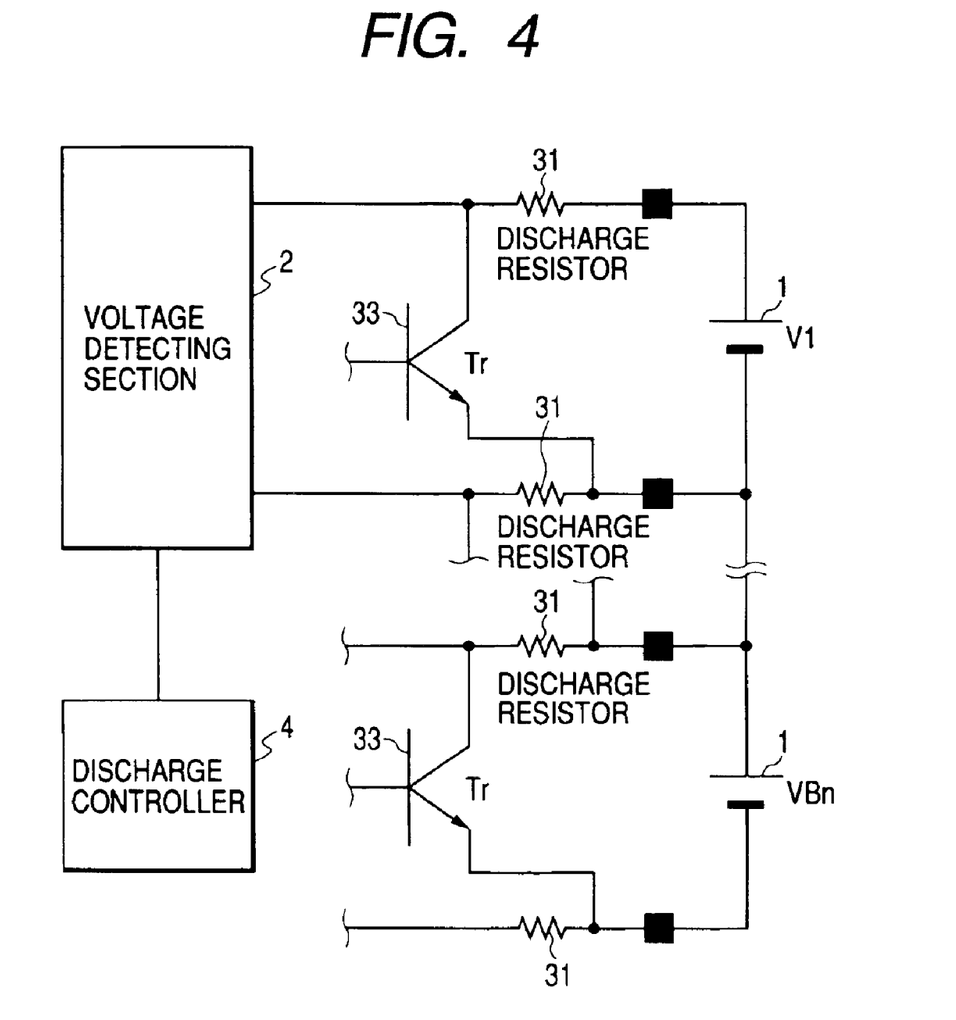
FIG. 4 is a circuit diagram showing a discharging apparatus for a combination battery in accordance with a third embodiment of the present invention.

Another preferred embodiment of the present invention will be explained hereinafter with reference to the circuit diagram shown in FIG. 4.

Figure 3:
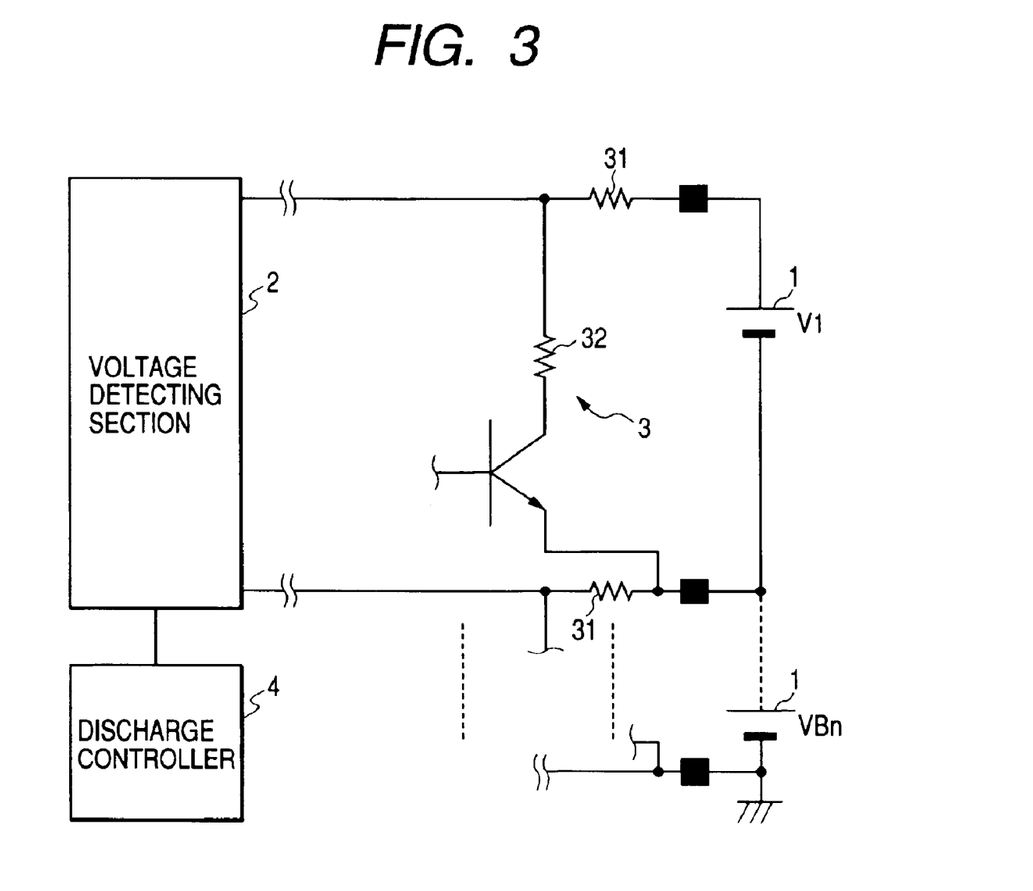
FIG. 3 is a circuit diagram showing a discharging apparatus for a combination battery in accordance with a second embodiment of the present invention.

This modified embodiment is different from the second embodiment shown in FIG. 3 in that the second discharge resistor 32 is removed from each discharging circuit 3. Although the discharge current increases by an amount corresponding to the removed second discharge resistor 32, such an increase in the discharge current can be substantially cancelled by increasing the resistance value of the first discharge resistor 31.

Figure 5:
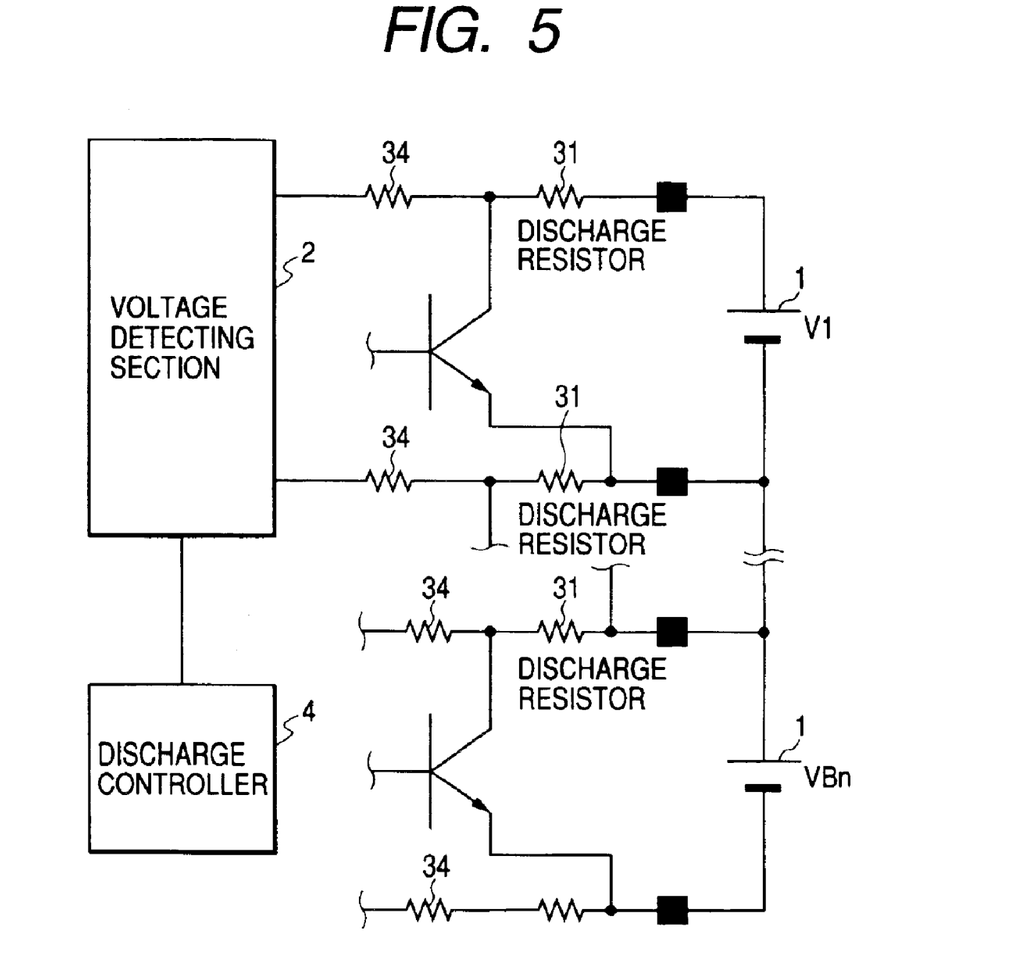
FIG. 5 is a circuit diagram showing a modified discharging apparatus for a combination battery in accordance with the third embodiment of the present invention.

FIG. 5 shows a modified circuit arrangement of the third embodiment. This modified embodiment is different from the third embodiment shown in 10, FIG. 4 in that the voltage detecting circuit 2 detects the cell voltage via a third resistor 34 and the first discharge resistor 31 being serially connected.

When the voltage detecting circuit is failed in that its input resistor becomes an abnormally small value, this modified embodiment can suppress the discharge current from increasing greatly. It is needless to say that the third resistor 34 can be employed in the second embodiment shown in FIG. 3.

Fourth Embodiment

Figure 6:
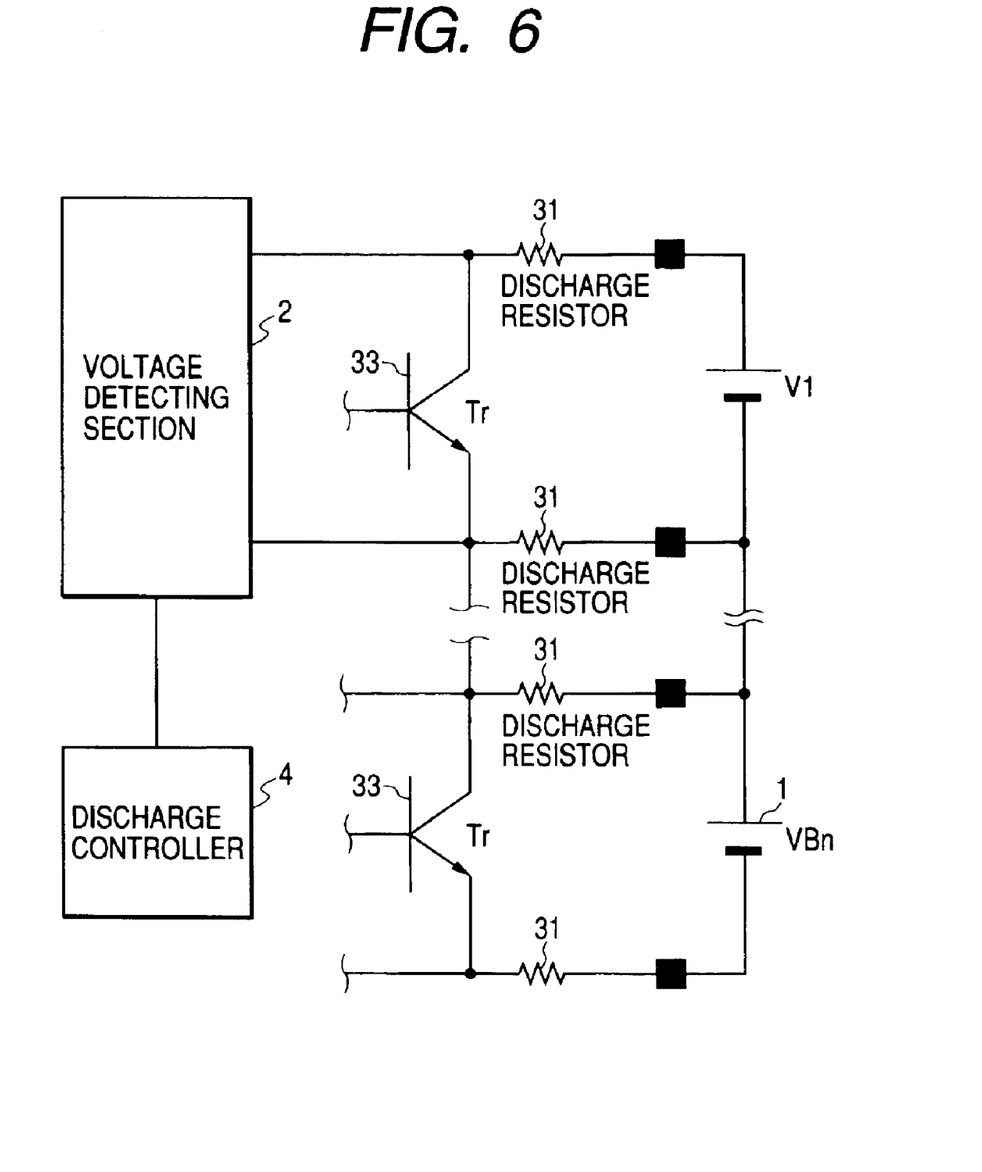
FIG. 6 is a circuit diagram showing a discharging apparatus for a combination battery in accordance with a fourth embodiment of the present invention.

Another preferred embodiment of the present invention will be explained hereinafter with reference to the circuit diagram shown in FIG. 6.

This modified embodiment is different from the first embodiment shown in FIG. 1 in that the second discharge resistor 32 is removed from each discharging circuit 3.

Although the discharge current increases by an amount corresponding to the removed second discharge resistor 32, such an increase in the discharge current can be substantially cancelled by increasing the resistance value of the first discharge resistor 31.

Figure 7:
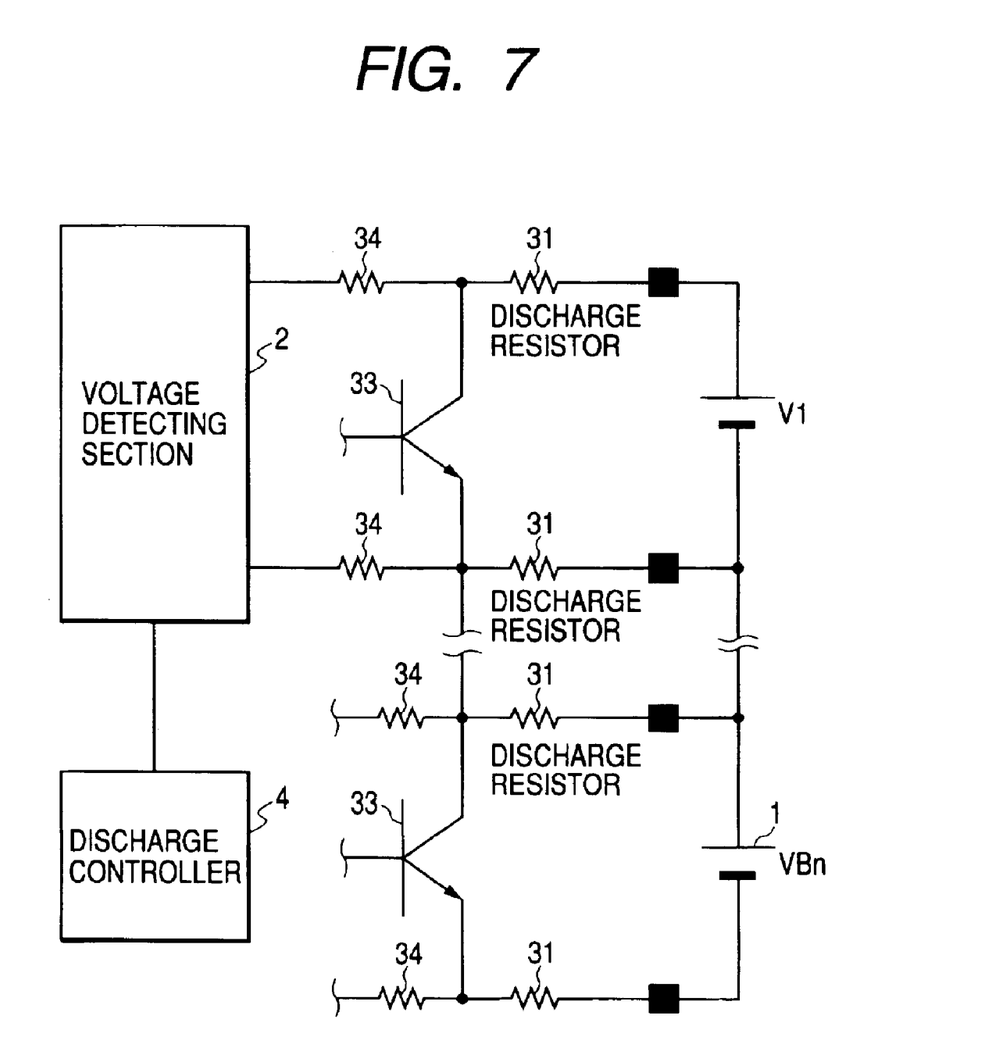
FIG. 7 is a circuit diagram showing a modified discharging apparatus for a combination battery in accordance with the fourth embodiment of the present invention.

FIG. 7 shows a modified circuit arrangement of the fourth embodiment. This modified embodiment is different from the fourth embodiment shown in FIG. 6 in that the voltage detecting circuit 2 detects the cell voltage via the third resistor 34 and the first discharge resistor 31 being serially connected. When the voltage detecting circuit is failed in that its input resistor becomes an abnormally small value, this modified embodiment can suppress the discharge current from increasing greatly. It is needless to say that the third resistor 34 can be employed in the first embodiment shown in FIG. 1.

Modified Embodiment

Instead of using a resistance element, the first discharge resistor 31 can be constituted by a MOS transistor or a fuse. Furthermore, it is possible to increase the ON resistance of the transistor 33 to a sufficiently large value so that the second discharge resistor 32 can be omitted. Furthermore, it is possible to selectively increase the ON resistance value of the transistor 33 only in case of the discharging circuit failure judgment under the condition that the cell voltage detection is performed in the ON condition of the transistor 33.

The increase of the ON resistance value can be realized by decreasing the gate voltage of the MOS transistor, or reducing the base current of the bipolar transistor to a lower level compared with the ordinary cell discharge condition as described above. Furthermore, it is preferable to input the cell voltage via a smoothing circuit (e.g., a low-pass filter) into the voltage detecting circuit 2 or output an output voltage of the voltage detecting circuit 2 via a smoothing circuit (e.g., a low-pass filter), so that the voltage detecting circuit 2 can detect the low-frequency component of the cell voltage. In this case, it is preferable to pulse drive the transistor 33 (i.e., PWM drive) when the voltage detecting circuit 2 performs the cell voltage detection in the ON condition of the transistor 33.

This operation may increase heat generation in the transistor 33. However, the time required for the failure detection of the discharging circuit 3 can be reduced. In other word, it is not necessary to improve the cooling ability of the transistor 33

Effect of Embodiments

Each of the above-described embodiments of the present invention provides a simple circuit arrangement for detecting ON failure and OFF failure of the discharge switch 33 as well as short circuit failure and breaking of wire failure of the discharge resistor 31 in the discharge circuit 3 for discharging an excessive voltage of a cell 1.

What is claimed is:

1. A discharging apparatus for a combination battery, comprising:

a discharging circuit, including at least one voltage drop element and a discharge switch being serially connected, for discharging a secondary battery serving as a constituent battery of a combination battery to reduce voltage differences among respective secondary batteries of said combination battery;

a voltage detecting circuit for detecting a terminal voltage of said secondary battery via said voltage drop element; and a discharging circuit failure judging section for judging a failure occurring in said discharging circuit based on a difference or a ratio in a comparison between a terminal voltage value detected when said discharge switch is turned on and a terminal voltage value detected when said discharge switch is turned off, which are time sequentially detected.

2. The discharging apparatus for a combination battery in accordance with claim 1, wherein said discharging circuit failure judging section cancels the failure judgment or abandons test result when an output voltage change of said voltage detecting circuit or a charge/discharge current of said combination battery is larger than a predetermined value.

3. The discharging apparatus for a combination battery in accordance with claim 1, wherein said discharging circuit failure judging section restricts charge/discharge of said combination battery when an operation test is performed.

4. The discharging apparatus for a combination battery in accordance with claim 1, wherein said discharging circuit failure judging section judges that said discharging circuit is in a ON failure condition when the difference between the terminal voltage value detected when said discharge switch is turned on and the terminal voltage value detected when said discharge switch is turned off is less than a predetermined value and said two terminal voltages are less than a predetermined value.

5. The discharging apparatus for a combination battery in accordance with claim 4, wherein said discharging circuit failure judging section prohibits said discharge switch from turning on in an event that said ON failure condition of said discharging circuit is detected.

6. The discharging apparatus for a combination battery in accordance with claim 1, wherein said discharging circuit failure judging section judges that said discharging circuit is in an OFF failure condition when the difference between the terminal voltage value detected when said discharge switch is turned on and the terminal voltage value detected when said discharge switch is turned off is less than a predetermined value and said two terminal voltages are equal to or larger than a predetermined value.

7. The discharging apparatus for a combination battery in accordance with claim 1, wherein said discharge switch serves as one of two voltage drop elements.

8. The discharging apparatus for a combination battery in accordance with claim 1, wherein said combination battery consists of lithium-group secondary batteries.

9. The discharging apparatus for a combination battery in accordance with claim 1, wherein said discharging circuit failure judging section executes the failure judgment when an ignition switch is turned off.

* * * * *